(12) United States Patent
Fujita et al.

(10) Patent No.: US 10,613,396 B2
(45) Date of Patent: Apr. 7, 2020

(54) DISPLAY DEVICE

(71) Applicant: SHARP KABUSHIKI KAISHA, Sakai, Osaka (JP)

(72) Inventors: Tetsuo Fujita, Sakai (JP); Yoshihito Hara, Sakai (JP); Yukinobu Nakata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/084,723

(22) PCT Filed: Mar. 13, 2017

(86) PCT No.: PCT/JP2017/009937
§ 371 (c)(1),
(2) Date: Sep. 13, 2018

(87) PCT Pub. No.: WO2017/159601
PCT Pub. Date: Sep. 21, 2017

(65) Prior Publication Data
US 2019/0079358 A1 Mar. 14, 2019

(30) Foreign Application Priority Data
Mar. 14, 2016 (JP) .................. 2016-050143

(51) Int. Cl.
*G02F 1/1345* (2006.01)
*G02F 1/1343* (2006.01)
(Continued)

(52) U.S. Cl.
CPC ...... *G02F 1/134336* (2013.01); *G02F 1/1345* (2013.01); *G02F 1/1368* (2013.01);
(Continued)

(58) Field of Classification Search
CPC ....... H01L 2224/73265; H01L 27/1214; H01L 27/124; H01L 27/3276; H01L 27/3244;
(Continued)

(56) References Cited

U.S. PATENT DOCUMENTS

2006/0220033 A1* 10/2006 Yamasaki ......... G02F 1/136209
257/79
2014/0176886 A1 6/2014 Yoshida

FOREIGN PATENT DOCUMENTS

JP 2008-003382 A 1/2008
WO 2013/021866 A1 2/2013

* cited by examiner

*Primary Examiner* — Thoi V Duong
(74) *Attorney, Agent, or Firm* — ScienBiziP, P.C.

(57) ABSTRACT

A display device according to an aspect of the present invention includes a first substrate, a second substrate, a liquid crystal layer, a plurality of signal lines, a plurality of switching elements, a plurality of connection terminals, and a plurality of lead lines. The plurality of lead lines include: first lead lines formed of a first conductive layer; second lead lines formed of a second conductive layer provided on a first insulating film covering the first lead lines; and third lead lines formed of a third conductive layer provided on a second insulating film covering the second lead lines. Among a plurality of conductive layers forming the switching elements, the lowest conductive layer is formed of the second conductive layer.

6 Claims, 18 Drawing Sheets

(51) Int. Cl.
    *G09F 9/30*         (2006.01)
    *G02F 1/1368*      (2006.01)
    *G02F 1/1362*      (2006.01)

(52) U.S. Cl.
    CPC .... *G02F 1/13458* (2013.01); *G02F 1/136286* (2013.01); *G09F 9/30* (2013.01); *G02F 2001/13629* (2013.01)

(58) Field of Classification Search
    CPC ............ H01L 27/3288; H01L 29/4908; H01L 29/41733; H01L 51/5246; G02F 1/1335; G02F 1/133512; G02F 1/133514; G02F 1/1339; G02F 1/1343; G02F 1/1345; G02F 1/13452; G02F 1/134363; G02F 1/13458; G02F 1/136; G02F 1/1362; G02F 1/136286; G02F 1/1368; G02F 1/133345; G02F 1/134336; G02F 1/13454; G02F 1/13456; G02F 2001/133388; G02F 2001/134372; G02F 2201/123; G09F 9/30
    See application file for complete search history.

DISPLAY DEVICE

TECHNICAL FIELD

An aspect of the present invention relates to a display device.

The present application claims priority based on Japanese Patent Application No. 2016-050143, filed in Japan on Mar. 14, 2016, the content of which is incorporated herein by reference.

BACKGROUND ART

Recent display devices have been progressing in terms of displaying images with enhanced resolution, and there is a trend of an increased number of signal lines on a substrate of such recent display devices compared with display devices of the related art. In a display device where a semiconductor chip for a driver is mounted on a substrate, lead lines for leading signal lines out to connection terminals connected to the semiconductor chip are provided in a peripheral region surrounding a display region. Further, in the recent display devices, it is desired that the peripheral region (i.e., picture-frame region) be reduced (namely, the picture-frame region be narrowed). However, because the number of lead lines increases with an increase in the number of signal lines, a large space may be required to arrange the lead lines, which may result in an increased area of the picture-frame region.

Patent Literature 1 described below discloses a display device that includes first gate lead lines, second gate lead lines, and third gate lead lines. In the display device described in Patent Literature 1, the first gate lead lines are formed on a base substrate, the second gate lead lines are formed on a gate insulating film, and the third gate lead lines are formed on a first passivation film.

CITATION LIST

Patent Literature

PTL 1: International Publication No. 2013/021866

SUMMARY OF INVENTION

Technical Problem

In the display device described in Patent Literature 1, since the third gate lead lines are formed on the first passivation film, the lead lines are located at positions extremely close to a liquid crystal layer.

Thus, an unintended voltage may sometimes be applied to the liquid crystal layer, or parasitic capacitance may sometimes be generated between the lead lines and gate lines, source lines, pixel electrodes, and the like. Due to such undesirable effects, there can arise the problem of display quality undesirably deteriorating.

In view of the aforementioned problem, an aspect of the present invention seeks to provide, as an object of the invention, a display device in which a picture-frame region may be narrowed while deterioration of display quality is suppressed.

Solution to Problem

In order to accomplish the aforementioned object, a display device according to an aspect of the present invention includes: a first substrate; a second substrate provided opposing a first surface of the first substrate; an electro-optical material layer provided between the first substrate and the second substrate; a plurality of signal lines provided on the first surface; a plurality of switching elements provided on the first surface; a plurality of connection terminals provided on the first surface; and a plurality of lead lines provided on the first surface and electrically connecting at least some of the plurality of signal lines and at least some of the plurality of connection terminals. The plurality of lead lines include: a first lead line formed of a first conductive layer provided on the first surface; a second lead line formed of a second conductive layer provided on a first insulating film covering the first lead line; and a third lead line formed of a third conductive layer provided on a second insulating film covering the second lead line. The lowest conductive layer among a plurality of conductive layers forming the switching elements is formed of the second conductive layer.

In the display device according to an aspect of the present invention, the switching elements may be thin film transistors, the plurality of signal lines may include a plurality of gate lines and a plurality of source lines, and the lead lines may electrically connect the source lines and the connection terminals.

In the display device according to an aspect of the present invention, a gate electrode of the thin film transistor may be formed of the second conductive layer.

The display device according to an aspect of the present invention may further include a sealing material that bonds the first substrate and the second substrate to each other, and the plurality of lead lines may intersect the sealing material as viewed in a direction normal to the first substrate.

In the display device according to an aspect of the present invention, the first lead line, the second lead line, and the third lead line may be provided at positions such that the first lead line, the second lead line, and the third lead line overlap one another at least partly as viewed in the direction normal to the first substrate.

Advantageous Effects of Invention

According to an aspect of the present invention, it is possible to provide a display device in which a picture-frame region may be reduced while deterioration of display quality is suppressed.

DESCRIPTION OF EMBODIMENTS

First Embodiment

Hereinafter, a first embodiment of the present invention is described with reference to FIGS. 1 to 9J.

The present embodiment is described in relation to a case in which a display device according to an aspect of the present invention is applied as a liquid crystal display device. Whereas the liquid crystal display device according to the present embodiment is preferably used as displays for, for example, mobile telephones, portable information terminals, game machines, digital cameras, printers, car navigation systems, intelligent home appliances, and the like, it should be noted that applications of the liquid crystal display device according to the present embodiment are not particularly limited.

(Overall Construction)

Figure 1:
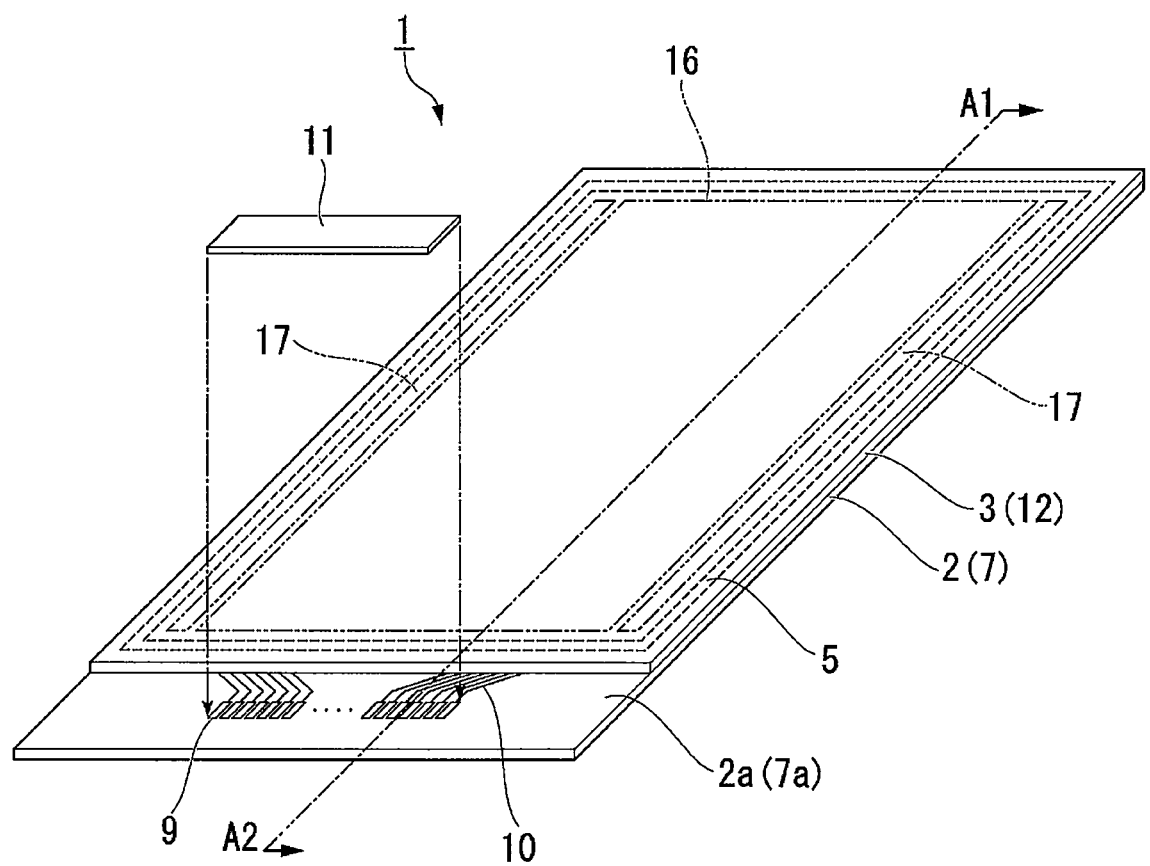
FIG. 1 is a perspective view of a liquid crystal display device according to a first embodiment.
Figure 2:
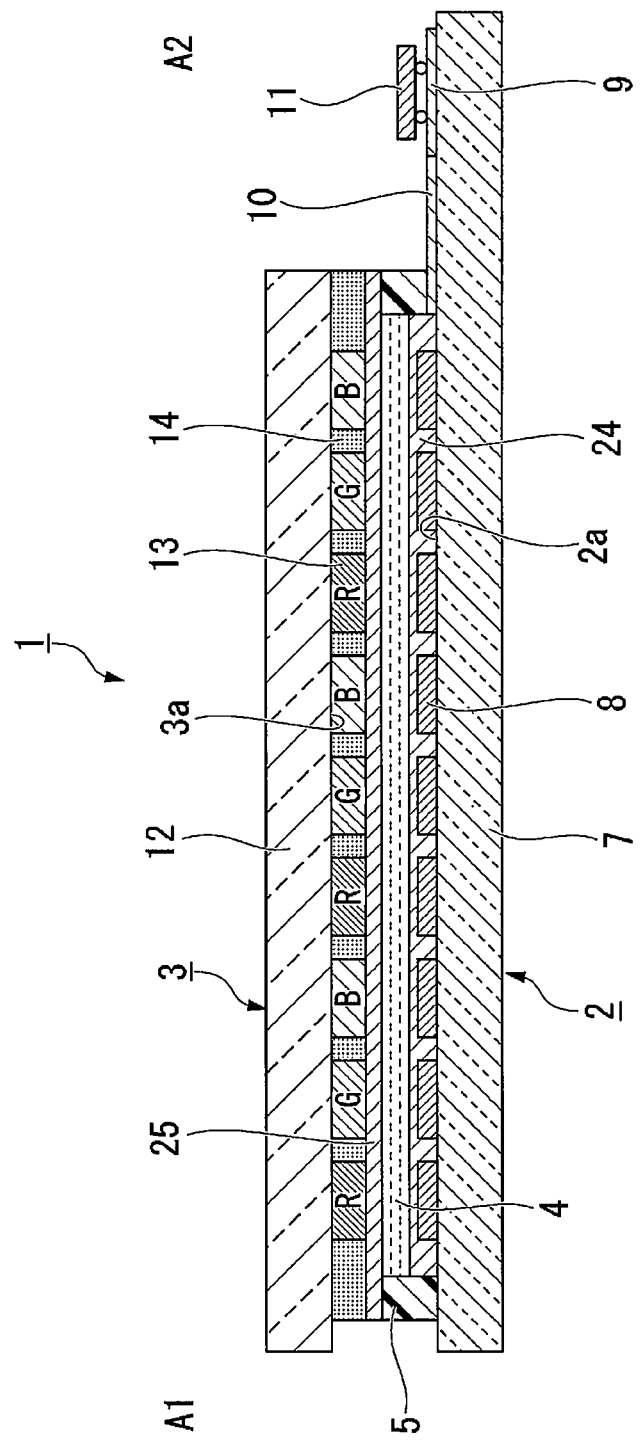
FIG. 2 is a sectional view taken along line A1-A2 of FIG. 1.
Figure 3:
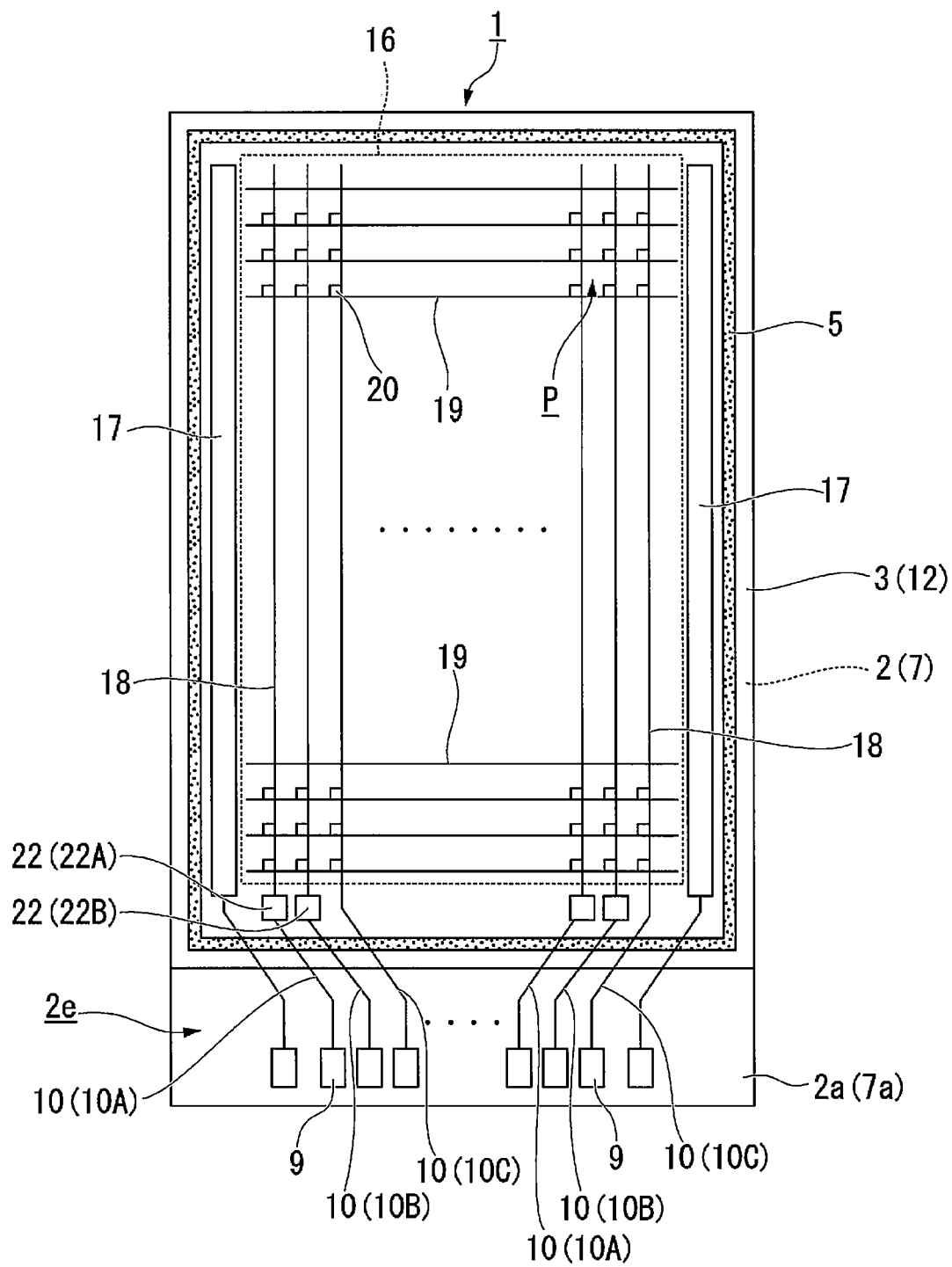
FIG. 3 is a plan view of the liquid crystal display device.

FIG. 1 is a perspective view of the liquid crystal display device according to the present embodiment. FIG. 2 is a sectional view taken along line A1-A2 of FIG. 1. FIG. 3 is a plan view of the liquid crystal display device.

Note that in respective figures to be described below, respective component elements of the display device are illustrated at different dimensional scales as necessary for easier viewing of the component elements.

As illustrated in FIGS. 1 and 2, the liquid crystal display device 1 according to the present embodiment includes an element substrate 2, a counter substrate 3, and a liquid crystal layer 4. The counter substrate 3 is provided opposing a first surface 2a of the element substrate 2. The liquid crystal layer 4 is provided between the element substrate 2 and the counter substrate 3. More specifically, the counter substrate 3 is bonded to the element substrate 2 via a sealing material 5 so as to oppose the first surface 2a of the element substrate 2. The liquid crystal layer 4 is enclosed in a space surrounded by the element substrate 2, counter substrate 3, and sealing material 5.

The liquid crystal layer 4 in the present embodiment corresponds to an electro-optical material layer in the claims.

The element substrate 2 generally includes: a first substrate 7; a plurality of thin film transistors (not illustrated in FIGS. 1 and 2); a plurality of source lines and a plurality of gate lines (not illustrated in FIGS. 1 and 2); a common electrode (not illustrated in FIGS. 1 and 2); a plurality of pixel electrodes 8; a plurality of connection terminals 9; a plurality of lead lines 10; and a semiconductor chip 11 for a driver. The counter substrate 3 generally includes a second substrate 12, a color filter 13, and a black matrix 14.

Further, as illustrated in FIG. 3, the element substrate 2 and the counter substrate 3 each have a rectangular shape in plan view as viewed in a direction normal to the substrates. Further, a dimension of the element substrate 2 in a longitudinal direction is larger than a dimension of the counter substrate 3 in the longitudinal direction, and one end portion of the element substrate 2 protrudes outwardly beyond one side of the counter substrate 3. In the following description, the end portion of the element substrate 2 protruding outwardly beyond the one side of the counter substrate 3 is referred to as "a protruding region 2e". For example, a transparent substrate, such as an alkali-free glass substrate, is used as the first substrate 7 forming the element substrate 2 and the second substrate 12 forming the counter substrate 3.

The sealing material 5 is provided in a rectangular ring shape along a peripheral edge portion of the counter substrate 3. The sealing material 5 may be formed, for example, of a photo-curable resin or a thermosetting resin. A display region 16 that contributes substantially to display is provided inside a rectangular region surrounded by the sealing material 5. Gate line control circuits 17 are provided in areas between the display region 16 and the sealing material 5 along respective long sides of the counter substrate 3.

The plurality of source lines 18 are provided on a first surface 7a of the first substrate 7. The plurality of source lines 18 are provided in parallel to one another at predetermined intervals such that each of the source lines 18 extends in a long-side direction of the first substrate 7. Further, the plurality of gate lines 19 are provided on the first surface 7a of the first substrate 7. The plurality of gate lines 19 are provided parallel to one another at predetermined intervals such that each of the gate lines 19 extends in a short-side direction of the first substrate 7. Thus, the plurality of source lines 18 and the plurality of gate lines 19 perpendicularly intersect each other.

The plurality of source lines 18 and the plurality of gate lines 19 correspond to a plurality of signal lines in the claims.

Each region surrounded by two adjoining source lines 18 and two adjoining gate lines 19 constitutes a pixel P that is a minimum display unit. A region where a plurality of such pixels P are disposed in a matrix with a plurality of rows and a plurality of columns corresponds to the display region 16. Each of the pixels P is provided with a thin film transistor for controlling the electrical potential of a pixel electrode of the pixel P. The thin film transistor is hereinafter abbreviated as TFT. A plurality of such TFTs 20 corresponding in number to the pixels are provided on the first surface 7a of the first substrate 7. In the liquid crystal display device 1 according to the present embodiment, each pixel is constituted by three pixels, that is, red (R), green (G), and blue (B) pixels.

The TFTs 20 in the present embodiment correspond to switching elements in the claims.

The plurality of connection terminals 9 are provided on the protruding region 2e of the first surface 2a of the element substrate 2 such that the connection terminals 9 are arranged in the short-side direction of the substrate 2. Further, as illustrated in FIG. 1, the semiconductor chip 11 for a driver is mounted on the protruding region 2e of the first surface 2a of the element substrate 2, and the semiconductor chip 11 for a driver and the plurality of connection terminals 9 are electrically connected to each other. The semiconductor chip 11 for a driver has a function of a source line control circuit that controls signals to be supplied to the plurality of source lines 18.

Further, the plurality of lead lines 10 are provided on the first surface 2a of the element substrate 2. Each of the plurality of lead lines 10 electrically connects one of the source lines 18 and one of the connection terminals 9.

Not all of the plurality of lead lines 10 are formed as direct extensions of the source lines 18; some of the lead lines 10 are formed of conductive layers different from a layer forming the source lines 18. The plurality of lead lines 10 include three types of lead lines, that is, first lead lines 10A, second lead lines 10B, and third lead lines 10C, as described later. These lead lines 10 are provided so as to intersect the sealing material 5.

Figure 4:
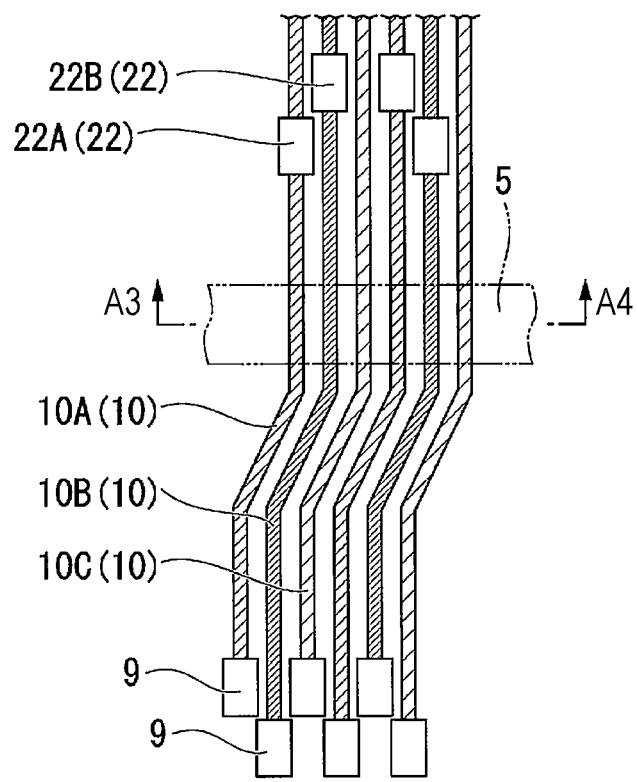
FIG. 4 is an enlarged view illustrating a lead wiring section.

FIG. 4 is an enlarged view illustrating a section where the lead lines 10 of FIG. 3 are provided.

As illustrated in FIG. 4, the first lead lines 10A, the second lead lines 10B, and the third lead lines 10C are sequentially arranged repeatedly in a lateral direction of FIG. 4. In the example illustrated in FIG. 3, the lead lines 10 are arranged repeatedly in sequence such as the first lead line 10A, the second lead line 10B, the third lead line 10C, the first lead line 10A, the second lead line 10B, and the third lead line 10C in a left-to-right direction in FIG. 3.

In plan view in the direction normal to the element substrate 2, the first lead line 10A, the second lead line 10B, and the third lead line 10C do not overlap one another. In other words, gaps or intervals are provided between the first lead line 10A and the second lead line 10B, between the second lead line 10B and the third lead line 10C, and between the third lead line 10C and the first lead line 10A.

A plurality of lead line contact sections 22 are arranged side-by-side in the short side direction of the element substrate 2. The plurality of lead line contact sections 22 are provided at connecting positions between the first lead lines 10A and the source lines 18 for electrically connecting the first lead lines 10A and the source lines 18. Likewise, the plurality of lead line contact sections 22 are provided at connecting positions between the second lead lines 10B and the source lines 18 for electrically connecting the second lead lines 10B and the source lines 18. The lead line contact sections 22 connecting the first lead lines 10A and the source lines 18 are hereinafter referred to as "first lead line contact sections 22A". The lead line contact sections 22 connecting the second lead lines 10B and the source lines 18 are hereinafter referred to as "second lead line contact sections 22B". Note that the third lead lines 10C and the source lines 18 are formed integrally of the same conductive layer, and thus, no contact section is needed between the third lead lines 10C and the source lines 18.

The plurality of lead line contact sections 22 are disposed inward of the sealing material 5. Note that whereas the plurality of connection terminals 9 and the plurality of lead line contact sections 22 are each illustrated in a single row in FIG. 3 for simplicity of illustration, the plurality of connection terminals 9 and the plurality of lead line contact sections 22 are, in effect, each arranged in two rows, as a whole, by being disposed alternately at positions that are displaced or staggered from each other in the longitudinal direction of the lead lines 10, as illustrated in FIG. 4.

Next, sectional constructions of the entire liquid crystal display device 1 and respective sections of the display device 1 are described with reference to FIGS. 2, 5, and 9J.

Figure 5:
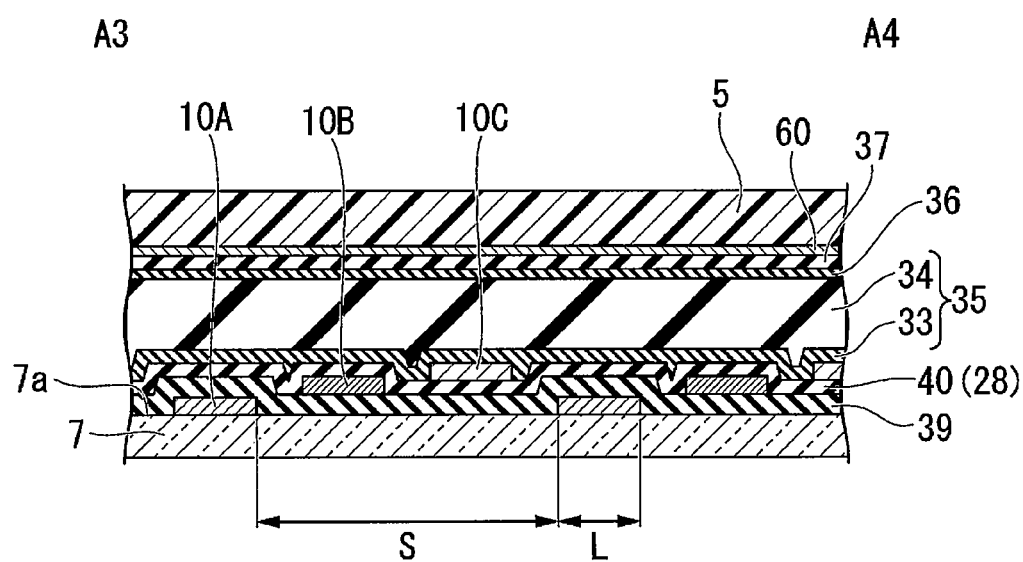
FIG. 5 is a sectional view taken along line A3-A4 of FIG. 4.

FIG. 5 is a sectional view taken along line A3-A4 of FIG. 4, which illustrates a sectional view of portions of the lead lines 10. FIG. 9J illustrates a sectional view of a portion of the TFT 20.

As illustrated in FIG. 2, the TFT (not shown), the common electrode (not shown), the pixel electrodes 8, and an alignment layer 24 are provided on the first surface 2a of the element substrate 2. On the other hand, the color filter 13, the black matrix 14, and an alignment layer 25 are provided on a first surface 3a of the counter substrate 3 opposing the element substrate 2. A color arrangement of the pixels R, G, and B in the color filter 13 is not particularly limited. Further, an aspect of the present invention is also applicable to a display device that does not have the color filter 13.

In an aspect of the present invention, a display method employed in the liquid crystal display device 1 may be any one of the TN (Twisted Nematic) method, the VA (Vertical Alignment) method, the lateral electric field method, such as the IPS (In-Plane Switching) or FFS (Fringe Field Switching), and the like. Although the display method used in the display device 1 is not particularly limited, it is assumed here that the present embodiment employs the FFS lateral electric field method as an example. Further, although the liquid crystal display device 1 includes a polarizer, a backlight unit, and the like in addition to the aforementioned component elements, such component elements are well known and thus are not described here. Furthermore, the liquid crystal display device 1 may also include a touch panel.

(Construction of the TFT)

Figure 9A:
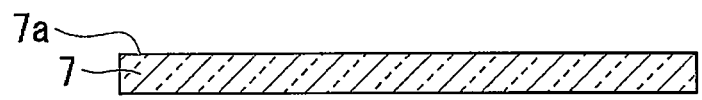
FIG. 9A is a sectional view illustrating a step of the method for manufacturing the liquid crystal display device (a section including a TFT).
Figure 9B:
FIG. 9B is a sectional view illustrating the step following the step of FIG. 9A.
Figure 9C:
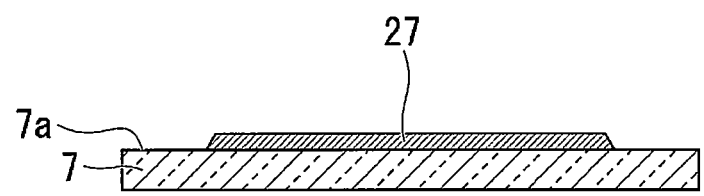
FIG. 9C is a sectional view illustrating the step following the step of FIG. 9B.
Figure 9D:
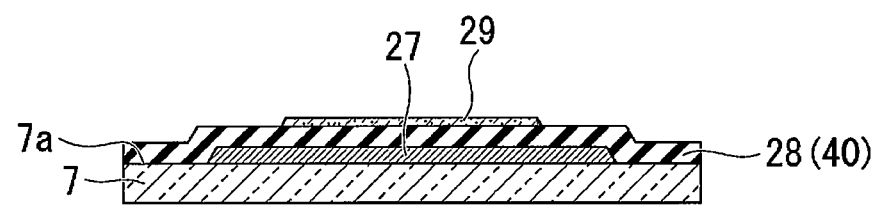
FIG. 9D is a sectional view illustrating the step following the step of FIG. 9C.
Figure 9E:
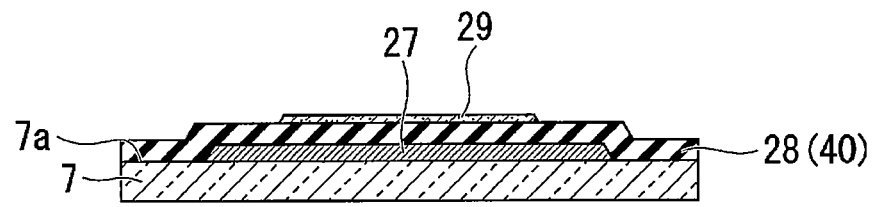
FIG. 9E is a sectional view illustrating the step following the step of FIG. 9D.
Figure 9F:
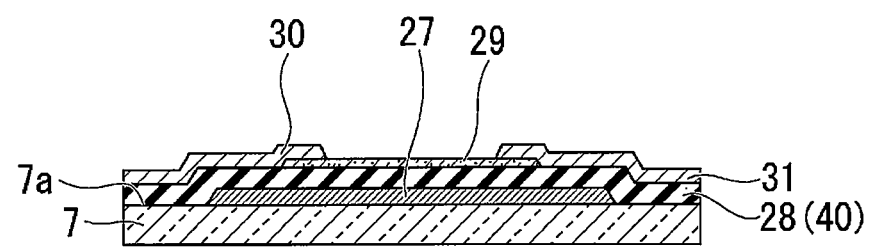
FIG. 9F is a sectional view illustrating the step following the step of FIG. 9E.
Figure 9G:
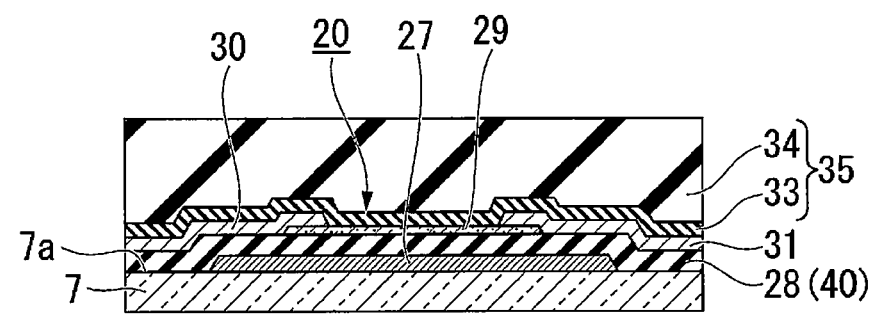
FIG. 9G is a sectional view illustrating the step following the step of FIG. 9F.
Figure 9H:
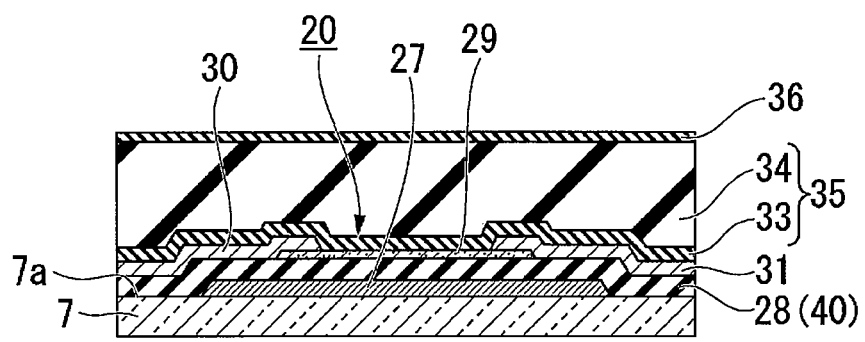
FIG. 9H is a sectional view illustrating the step following the step of FIG. 9G.
Figure 9I:
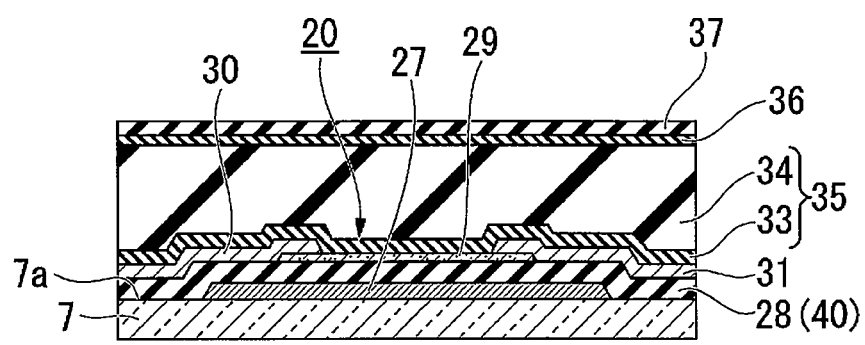
FIG. 9I is a sectional view illustrating the step following the step of FIG. 9H.
Figure 9J:
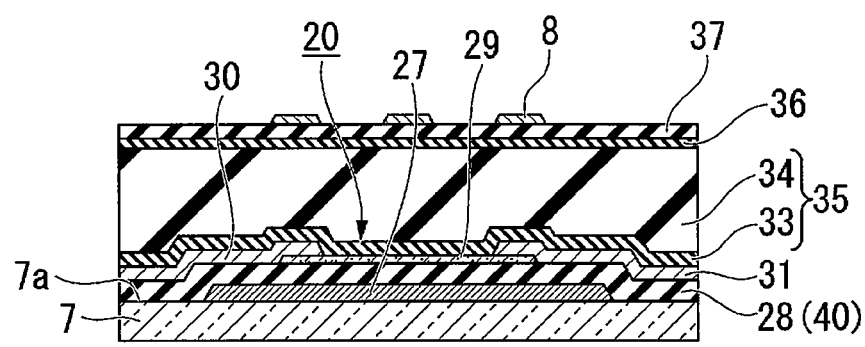
FIG. 9J is a sectional view illustrating the step following the step of FIG. 9I.

As illustrated in FIG. 9J, the TFT 20 includes a gate electrode 27, a gate insulating layer 28, a semiconductor layer 29, a source electrode 30, and a drain electrode 31. The gate electrode 27 is formed of a second conductive layer and provided on the first surface 7a of the first substrate 7. The gate insulating layer 28 is formed of a second insulating layer and provided on the entire surface of the first substrate 7 so as to cover the gate electrode 27. The semiconductor layer 29 is provided on the gate insulating layer 28. The source electrode 30 is formed of a third conductive layer and provided in contact with one end of the semiconductor layer 29. The drain electrode 31 is formed of the third conductive layer and provided in contact with the other end of the semiconductor layer 29. That is, the gate electrode 27, which is the lowest conductive layer among the plurality of conductive layers constituting the TFT 20, is formed of the second conductive layer.

Although not illustrated in FIG. 9J, the gate line 19 is formed integrally with the gate electrode 27, and the source line 18 is formed integrally with the source electrode 30. The TFT 20 in the present embodiment is a so-called bottom-gate TFT. Note, however, that a top-gate TFT may be employed as the TFT 20 in the display device of an aspect of the present invention.

For example, a single-layer film of metal, such as aluminum, copper, titanium, molybdenum, or chromium, or a laminated film of these metal materials, is used as the second conductive layer forming the gate electrode 27 and the gate line 19. Similarly, a single-layer film of metal, such as aluminum, copper, titanium, molybdenum, or chromium, or a laminated film of these metal materials, is used as the third conductive layer forming the source line 18, the source electrode 30, and the drain electrode 31. An insulating film, such as a silicon oxide film, a silicon nitride film, or the like, is used as the second insulating layer forming the gate insulating layer 28.

The TFT 20 is covered with a first passivation layer 35 formed of a laminated film including an inorganic insulating layer 33 and an organic insulating layer 34. For example, an insulating film, such as a silicon oxide film or a silicon nitride film, is used as the inorganic insulating layer 33. For example, an acrylic photosensitive resin is used as the organic insulating layer 34.

A common electrode 36, a second passivation layer 37, and the pixel electrodes 8 are provided on or above the first passivation layer 35 in the mentioned order. A transparent conductive film formed, for example, of an indium tin oxide (hereinafter abbreviated as ITO), or a reflective metal film formed, for example, of aluminum, platinum, or nickel may be used to form the common electrode 36 and the pixel electrodes 8. Further, an inorganic insulating layer or an organic insulating layer similar to the inorganic or organic insulating layer of the first passivation layer 35 is used as the second passivation layer 37.

(Construction of Lead Lines)

As illustrated in FIG. 5, the plurality of lead lines 10 include three types of lead lines, that is, the first lead lines 10A, the second lead lines 10B, and the third lead lines 10C. The first lead lines 10A are formed of a first conductive layer provided on the first surface 7A of the first substrate 7. The second lead lines 10B are formed of a second conductive layer provided on a first insulating film 39 that covers the first lead lines 10A. The third lead lines 10C are formed of a third conductive layer provided on a second insulating film 40 that covers the second lead lines 10B. That is, the second lead lines 10B are formed of the same second conductive layer as the gate electrodes 27 and the gate lines 19. The third lead lines 10C are formed of the same third conductive layer as the drain electrodes 31, the source electrodes 30, and the source lines 18.

In other words, the first conductive layer forming the first lead lines 10A is a conductive layer which is located below the second conductive layer forming the gate lines 19 and which is formed in a manufacturing step prior to the formation of the gate lines 19. Further, the first insulating layer 39 covering the first lead lines 10A is a conductive layer which is located below the second conductive layer forming the gate lines 19 and which is formed in a manufacturing step prior to the formation of the gate lines 19. A material similar to the material of the gate lines 19, such as a single-layer film of metal, such as aluminum, copper, titanium, molybdenum, or chromium, or a laminated film of these metal materials, is used to form the first conductive layer. A material similar to the material of the gate insulating layer 28, such as a silicon oxide film or a silicon nitride film, is used to form the first insulating layer 39.

(Method for Manufacturing the Liquid Crystal Display Device)

Next, the method for manufacturing the liquid crystal display device 1 having a configuration described above is described with reference to FIGS. 6A to 9J. Here, the method is described, centering particularly on a method for manufacturing the element substrate 2.

FIGS. 6A to 6J are sectional views illustrating changes in a layered structure of a connection terminal formation region, where the connection terminal 9 is formed, the changes occurring as the manufacturing step sequence progresses.

FIGS. 7A to 7J are sectional views illustrating changes in a layered structure of a lead line contact section formation region, where the lead line contact section 22 is formed, the changes occurring as the manufacturing step sequence progresses.

FIGS. 8A to 8J are sectional views illustrating changes in a layered structure of a lead line formation region, where the lead lines 10 are formed, the changes occurring as the manufacturing step sequence progresses.

FIGS. 9A to 9J are sectional views illustrating changes in a layered structure of a TFT formation region, where the TFT 20 is formed, the changes occurring as the manufacturing step sequence progresses.

Figure 6A:
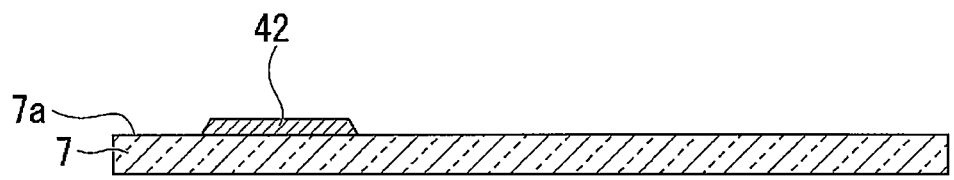
FIG. 6A is a sectional view illustrating a step of a method for manufacturing the liquid crystal display device (a section including a connection terminal).
Figure 7A:
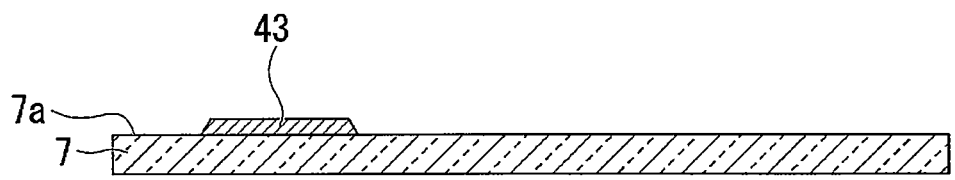
FIG. 7A is a sectional view illustrating a step of the method for manufacturing the liquid crystal display device (a lead line contact section).
Figure 8A:
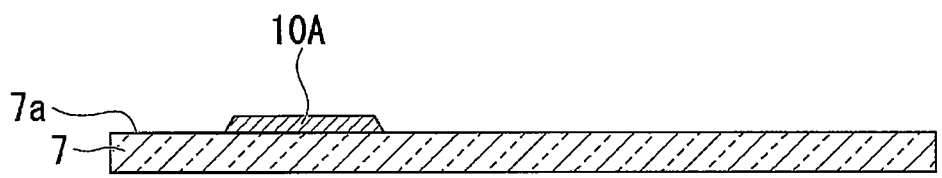
FIG. 8A is a sectional view illustrating a step of the method for manufacturing the liquid crystal display device (a lead line).

First, as illustrated in FIGS. 6A, 7A, and 8A, the first conductive layer is formed on the first surface 7a of the first substrate 7, for example, by a sputtering method or the like, and then, the first conductive layer is subjected to patterning by a photolithography method. In this manner, a first conductive layer pattern 42 of the connection terminal formation region, a first conductive layer pattern 43 of the contact section formation region, and the first lead line 10A of the lead line formation region are formed. In this step, the first conductive layer of the TFT formation region is not caused to remain, as illustrated in FIG. 9A.

Figure 6B:
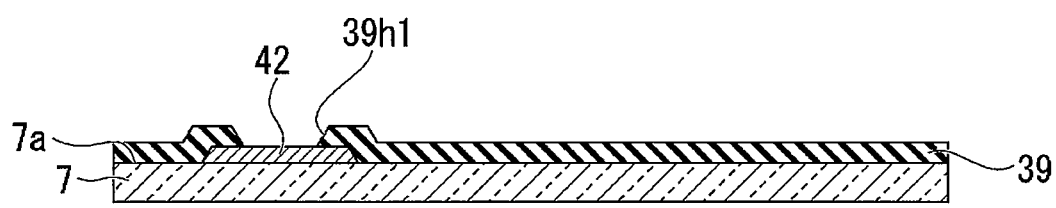
FIG. 6B is a sectional view illustrating the step following the step of FIG. 6A.
Figure 7B:
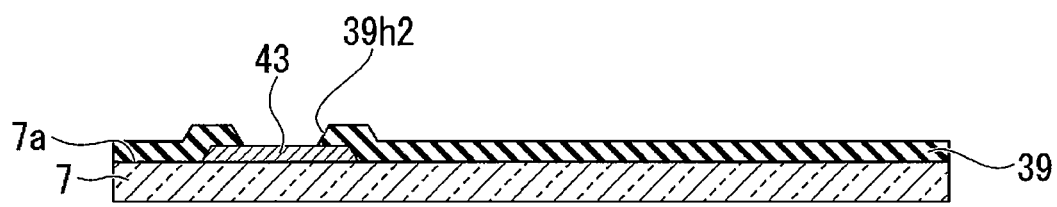
FIG. 7B is a sectional view illustrating the step following the step of FIG. 7A.
Figure 8B:
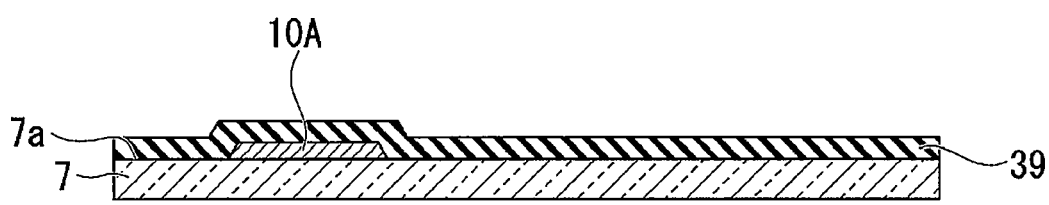
FIG. 8B is a sectional view illustrating the step following the step of FIG. 8A.

Then, as illustrated in FIGS. 6B, 7B, and 8B, the first insulating layer 39 covering the first conductive layer patterns 42, the first conductive layer patterns 43, and the first lead lines 10A is formed on the entire first surface 7a, for example, by a CVD method or the like. Subsequently, the first insulating layer 39 on the first conductive layer pattern 42 of the connection terminal formation region is partly removed so as to form an opening section 39h1. Simultaneously, the first insulating layer 39 on the first conductive layer pattern 43 of the contact section formation region is partly removed so as to form an opening section 39h2. At this time, the first insulating layer 39 is not caused to remain in the TFT formation region, as illustrated in FIG. 9B.

Figure 6C:
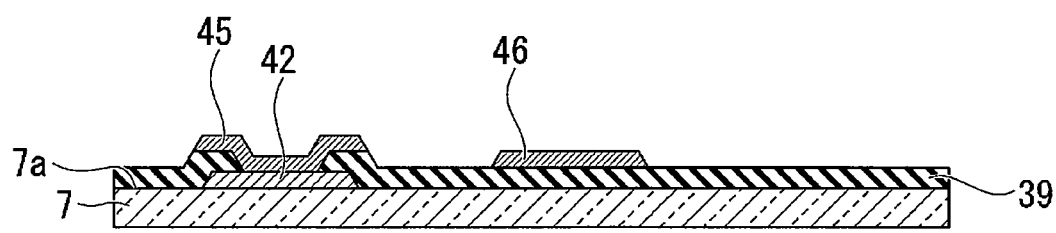
FIG. 6C is a sectional view illustrating the step following the step of FIG. 6B.
Figure 7C:
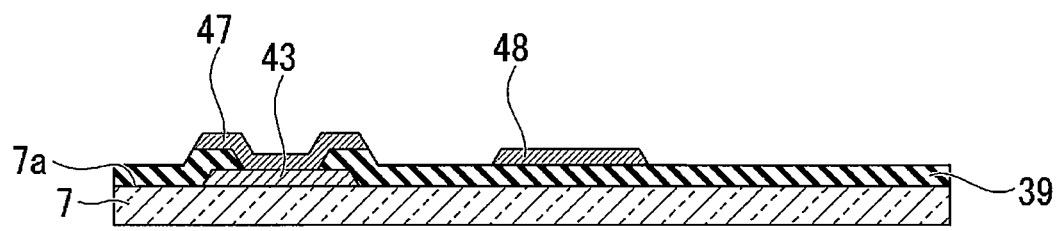
FIG. 7C is a sectional view illustrating the step following the step of FIG. 7B.
Figure 8C:
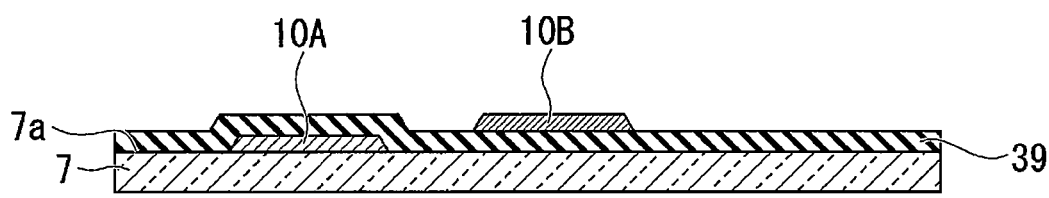
FIG. 8C is a sectional view illustrating the step following the step of FIG. 8B.

Subsequently, as illustrated in FIGS. 6C, 7C, and 8C, the second conductive layer is formed on the first insulating layer 39, for example, by the sputtering method or the like, and then, the second conductive layer is subjected to patterning by the photolithography method. In this manner, second conductive layer patterns 45 and 46 of the connection terminal formation region, second conductive layer patterns 47 and 48 of the contact section formation region, and the second lead line 10B of the lead line formation region are formed. In the TFT formation region, the gate electrode 27 and the gate line 19 formed of the second conductive layer are formed on the first surface 7a of the first substrate 7, as illustrated in FIG. 9C.

Figure 6D:
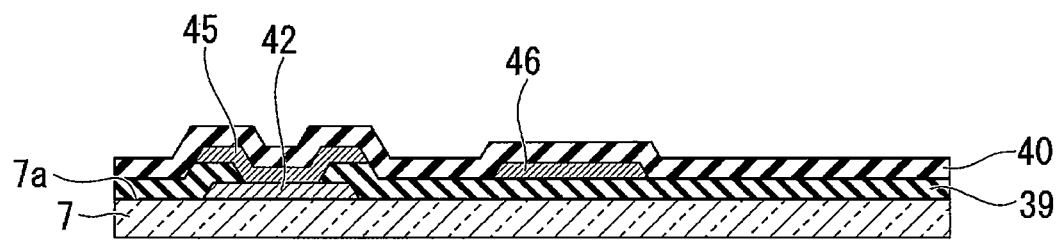
FIG. 6D is a sectional view illustrating the step following the step of FIG. 6C.
Figure 7D:
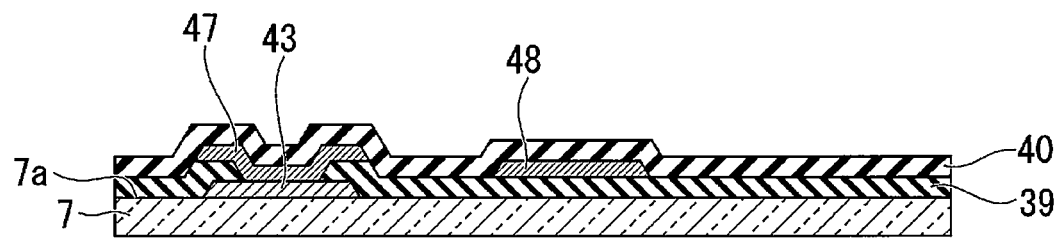
FIG. 7D is a sectional view illustrating the step following the step of FIG. 7C.
Figure 8D:
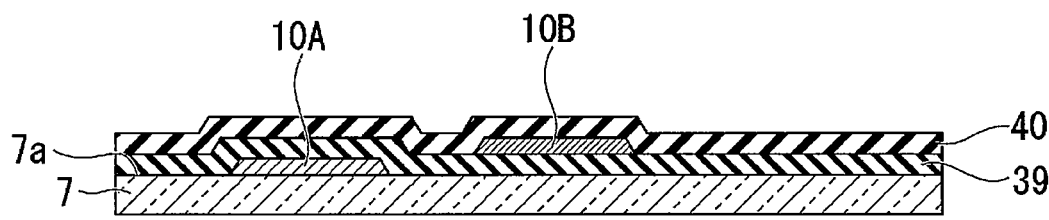
FIG. 8D is a sectional view illustrating the step following the step of FIG. 8C.

Subsequently, as illustrated in FIGS. 6D, 7D, and 8D, the second insulating layer 40 covering the second conductive layer patterns 45 and 46, second conductive layer patterns 47 and 48, and second lead line 10B is formed on the first insulating film 39, for example, by the CVD method or the like. At this time, in the TFT formation region, the gate insulating layer 28 formed of the second insulating layer 40 that covers the gate electrode 27 is produced, as illustrated in FIG. 9D. Subsequently, a semiconductor layer is formed on the second insulating layer 40, for example, by the sputtering method or the like, and the semiconductor layer is subjected to patterning by the photolithography method. In this manner, the semiconductor layer 29 of the TFT formation region is formed.

Figure 6E:
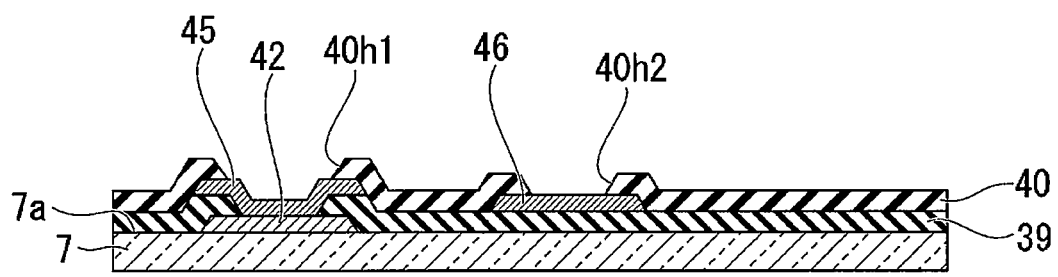
FIG. 6E is a sectional view illustrating the step following the step of FIG. 6D.
Figure 7E:
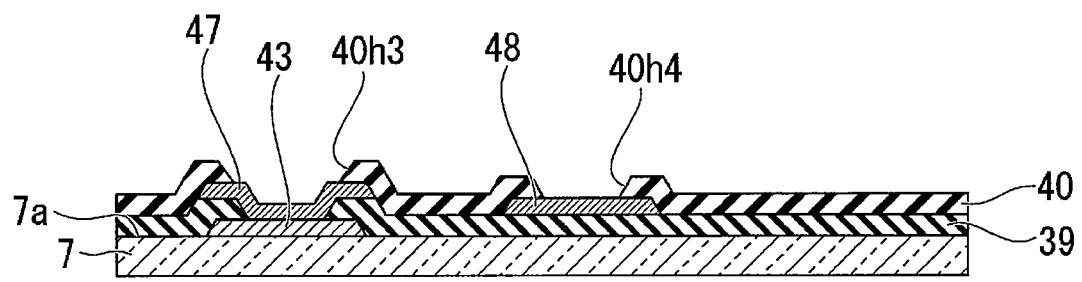
FIG. 7E is a sectional view illustrating the step following the step of FIG. 7D.
Figure 8E:
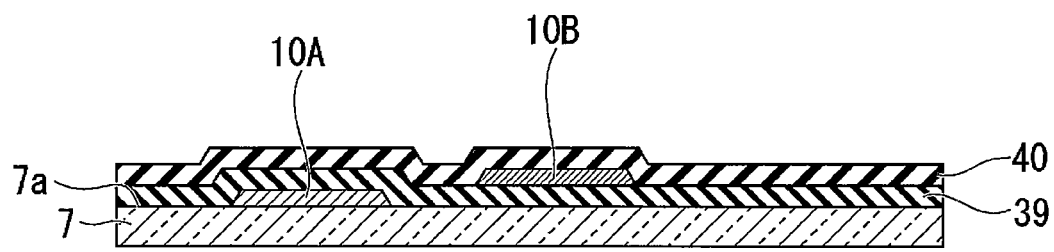
FIG. 8E is a sectional view illustrating the step following the step of FIG. 8D.

Next, as illustrated in FIGS. 6E, 7E, and 8E, the second insulating layer 40 on the conductive layer patterns 45 and 46 of the connection terminal formation region is partly removed so as to form opening sections 40h1 and 40h2. Simultaneously, the second insulating layer 40 on the second conductive layer pattern 47 and 48 of the contact section formation region is partly removed so as to form opening sections 40h3 and 40h4.

Figure 6F:
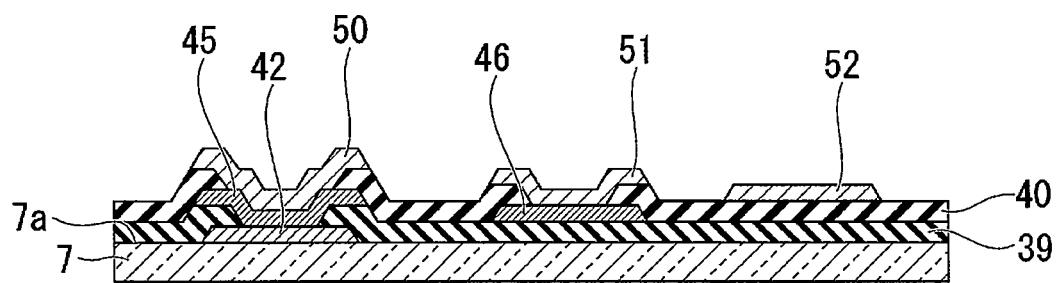
FIG. 6F is a sectional view illustrating the step following the step of FIG. 6E.
Figure 7F:
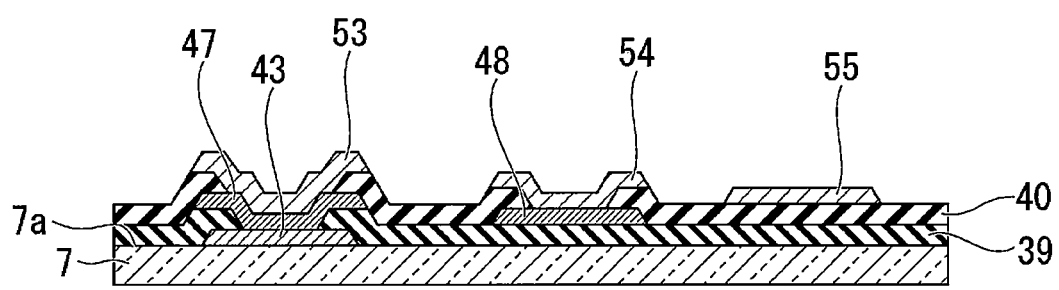
FIG. 7F is a sectional view illustrating the step following the step of FIG. 7E.
Figure 7G:
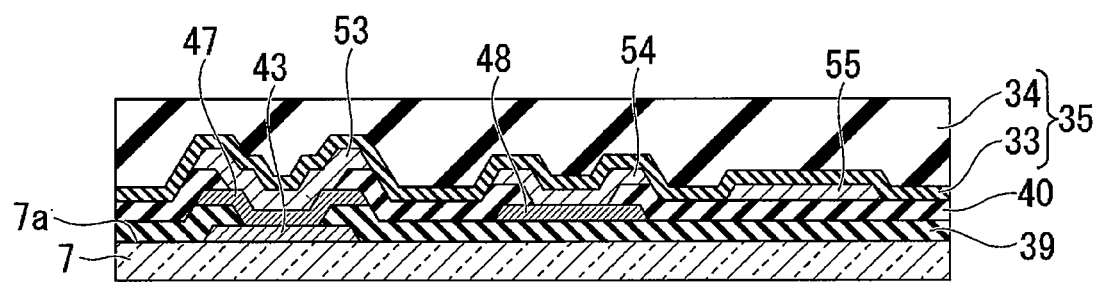
FIG. 7G is a sectional view illustrating the step following the step of FIG. 7F.
Figure 8F:
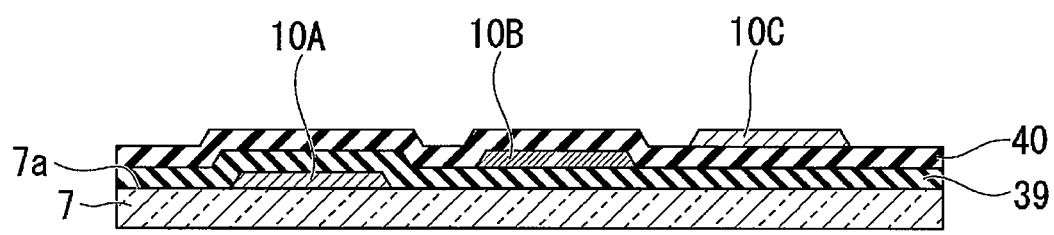
FIG. 8F is a sectional view illustrating the step following the step of FIG. 8E.
Figure 8G:
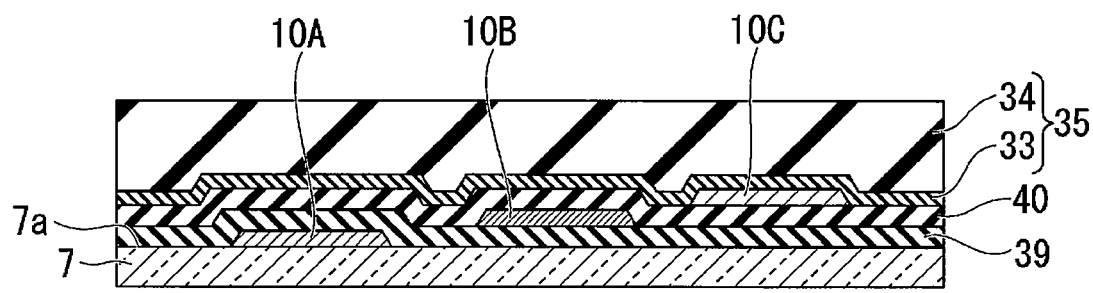
FIG. 8G is a sectional view illustrating the step following the step of FIG. 8F.

Then, as illustrated in FIGS. 6F, 7F, and 8F, the third conductive layer is formed on the second insulating layer 40, for example, by the sputtering method or the like, and then, the third conductive layer is subjected to patterning by the photolithography method. In this manner, third conductive layer patterns 50, 51, and 52 of the connection terminal formation region, third conductive layer patterns 53, 54, and 55 of the contact section formation region, and the third lead line 10C of the lead line formation region are formed. In the TFT formation region, the source electrode 30, drain electrode 31, and source line 18 (not shown), which are formed of the third conductive layer, are formed on the upper surface of the gate insulating layer 28 and on the upper surfaces of portions of the semiconductor layer 29, as illustrated in FIG. 9F.

Figure 6G:
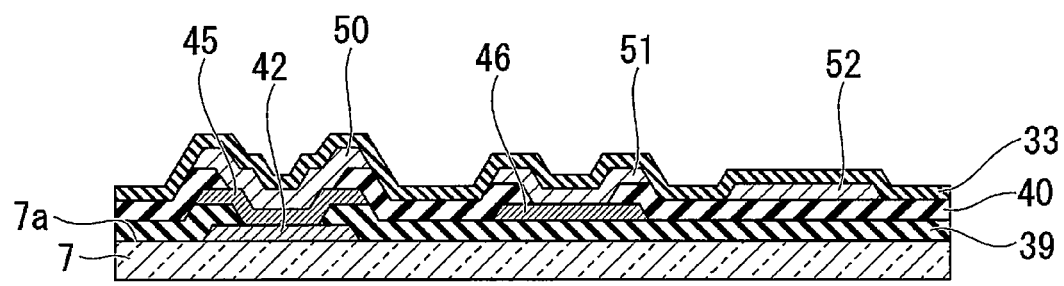
FIG. 6G is a sectional view illustrating the step following the step of FIG. 6F.

Next, the inorganic insulating layer 33 and the organic insulating layer 34 are sequentially formed on or above the second insulating layer 40, as illustrated in FIGS. 6G, 7G, 8G, and 9G. The inorganic insulating layer 33 may be formed, for example, by the CVD method, and the organic insulating layer 34 may be formed, for example, by a coating method. In this manner, the first passivation layer 35 covering the third conductive layer patterns 50, 51 and 52, third conductive layer patterns 53, 54 and 55, third lead line 10C, and TFT 20 is formed. At this time, in the connection terminal formation region, the organic insulating layer 34 is removed with only the inorganic insulating layer 33 remaining, as illustrated in FIG. 6G. In a case in which an acrylic photosensitive resin is used as a material of the organic insulating layer 34, patterning of the organic insulating layer 34 may be enabled by subjecting the acrylic photosensitive resin to a mask exposure.

Figure 6H:
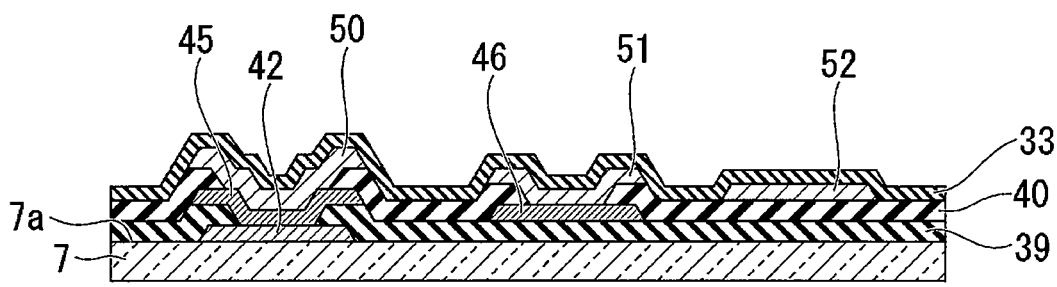
FIG. 6H is a sectional view illustrating the step following the step of FIG. 6G.
Figure 6I:
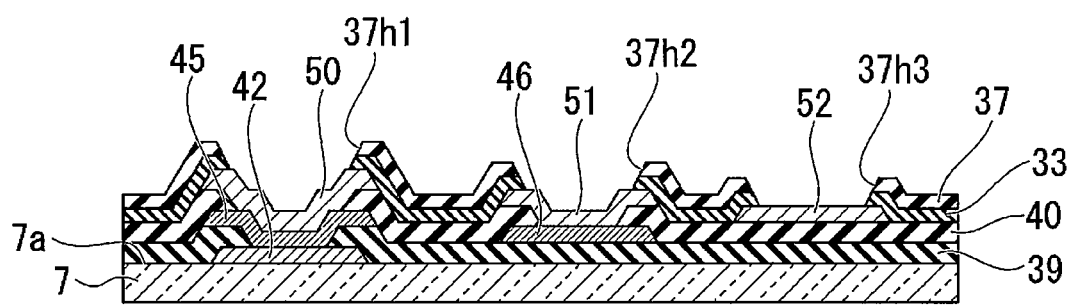
FIG. 6I is a sectional view illustrating the step following the step of FIG. 6H.
Figure 6J:
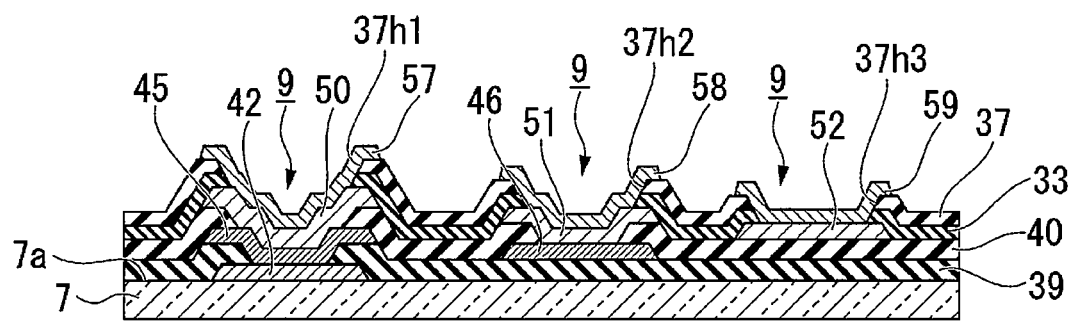
FIG. 6J is a sectional view illustrating the step following the step of FIG. 6I.
Figure 7H:
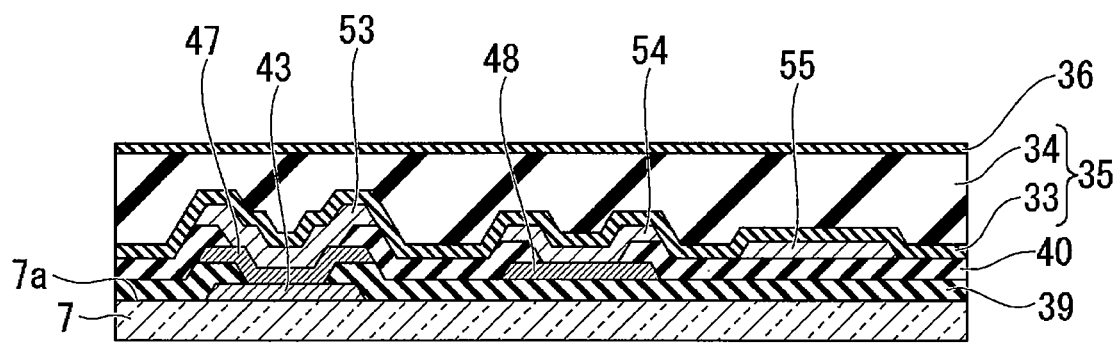
FIG. 7H is a sectional view illustrating the step following the step of FIG. 7G.
Figure 7I:
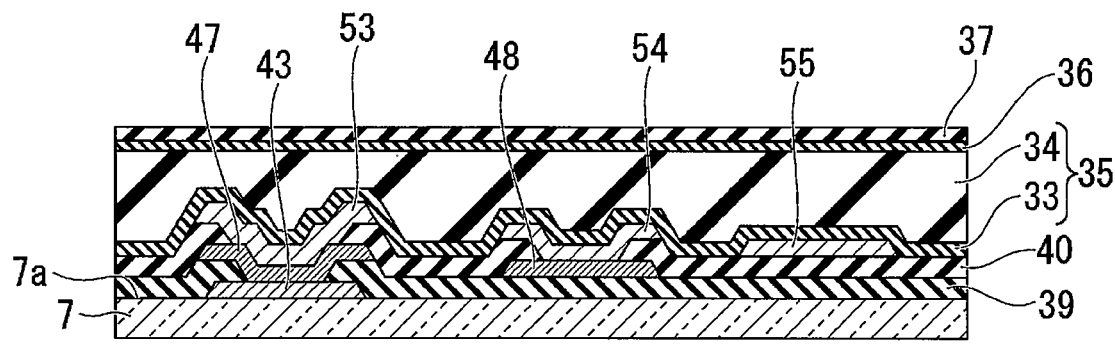
FIG. 7I is a sectional view illustrating the step following the step of FIG. 7H.
Figure 7J:
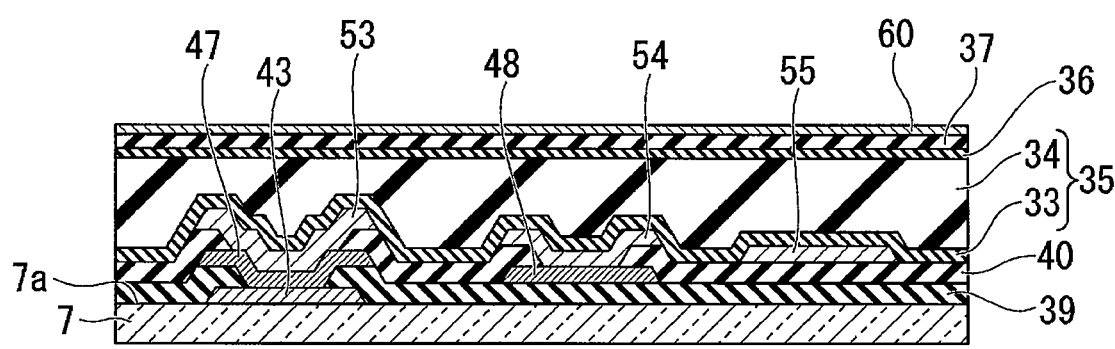
FIG. 7J is a sectional view illustrating the step following the step of FIG. 7I.
Figure 8H:
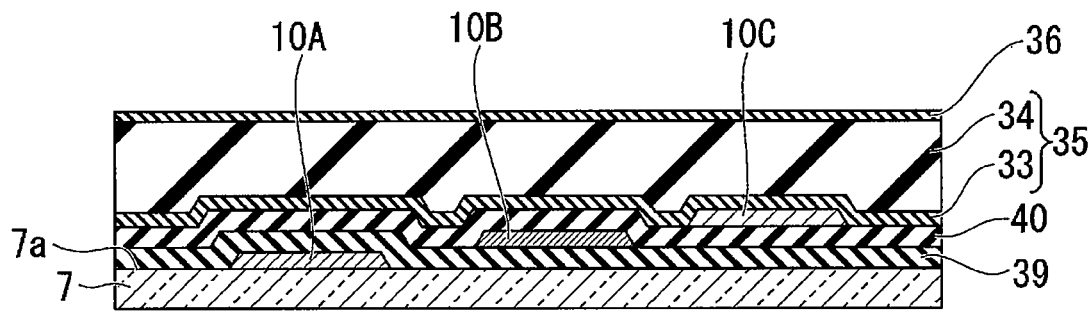
FIG. 8H is a sectional view illustrating the step following the step of FIG. 8G.
Figure 8I:
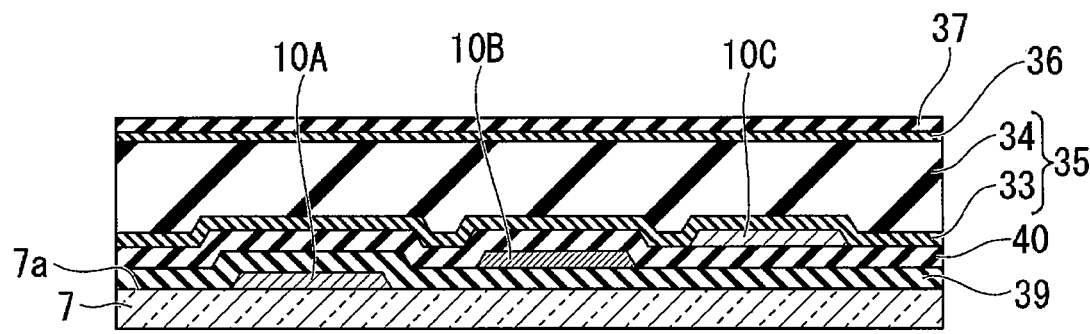
FIG. 8I is a sectional view illustrating the step following the step of FIG. 8H.
Figure 8J:
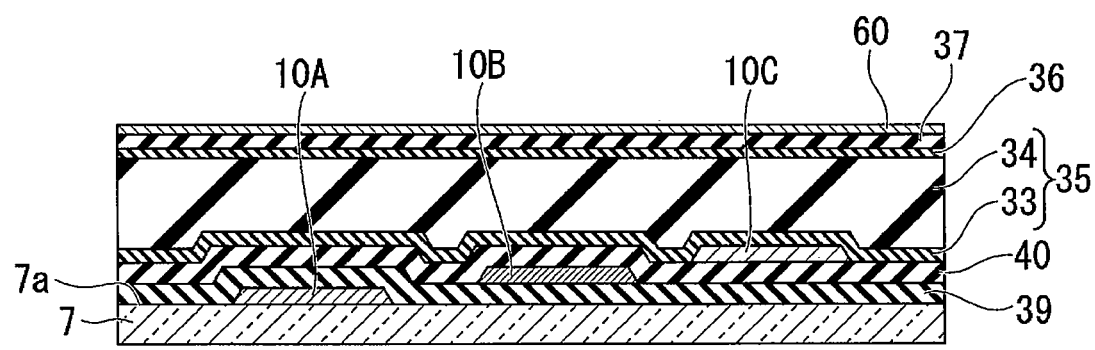
FIG. 8J is a sectional view illustrating the step following the step of FIG. 8I.

Subsequently, as illustrated in FIGS. 7H, 8H, and 9H, a fourth conductive layer is formed on the first passivation layer 35, for example, by the sputtering method or the like, and the fourth conductive layer is subjected to patterning by the photolithography method. In this manner, the common electrode 36 is formed. At this time, the fourth conductive layer is not caused to remain in the connection terminal formation region, as illustrated in FIG. 6H.

Next, as illustrated in FIGS. 6I, 7I, 8I, and 9I, the second passivation layer 37 covering the common electrode 36 is formed over the entire first surface 7a, for example, by the CVD method or the like. Subsequently, the inorganic insulating film 33 and the second passivation layer 37 on or above the third conductive layer patterns 50, 51, and 52 of the connection terminal formation region are partly removed to form opening sections 37h1, 37h2, and 37h3.

Next, as illustrated in FIGS. 6J, 7J, 8J, and 9J, a fifth conductive layer is formed on the second passivation layer 37, for example, by the sputtering method or the like, and the fifth conductive layer is subjected to patterning by the photolithography method. In this manner, the pixel electrodes 8 are formed in the TFT formation region. The fifth conductive layer 60 remains in the other regions. Further, the fifth conductive layer patterns 57, 58, and 59 connected to the third conductive layer patterns 50, 51, and 52, respectively, are formed in the connection terminal formation region. Thus, the fifth conductive layer patterns 57, 58, and 59 constitute the highest layer of the connection terminal 9.

Subsequently, the element substrate 2 is completed by forming the alignment layer 24 on the entire first surface 7a by using a well-known method, although not illustrated in the drawings.

On the other hand, the counter substrate 3 is completed by forming the black matrix 14, the color filter 13, and the alignment film 25 by using well-known methods.

The liquid crystal display device 1 according to the present embodiment is completed by bonding the element substrate 2 and the counter substrate 3 to each other via the sealing material 5 with the liquid crystal layer disposed between the element substrate 2 and the counter substrate 3, and then hardening the sealing material 5.

Advantageous Effects of the Present Embodiment

As the number of the signal lines increases, for example, to enhance the resolution of the display screen, the number of the lead lines is increased. However, desired reduction in the width L of the lead lines 10 and the interval S between the lead lines 10 may be limited, as illustrated in FIG. 5, due to restraints on the width L of the lead lines 10 and the interval S between the lead lines 10 relating to the manufacturing process. Thus, liquid crystal display devices of the related art require a wide space for arranging the lead lines, thereby presenting the problem of a picture-frame region having an increased area.

By contrast, in the liquid crystal display device 1 according to the present embodiment, the plurality of lead lines 10 include three layers of lead lines, namely, the first lead lines 10A, the second lead lines 10B, and the third lead lines 10C which are formed of different conductive layers. Thus, even if the lead lines 10 have an identical width L and an identical interval S, the lead lines 10 can be arranged at a density per unit area that is three times as high as that in a case in which the plurality of lead lines 10 are formed of the same conductive layer. In this way, it is possible to suppress an increase in the area of the picture-frame region due to an increase in the number of the lead lines 10, thereby the picture-frame region of the liquid crystal display device 1 being narrowed.

Further, as set forth above, the display device described in Patent Literature 1, where the lead lines are located extremely close to the liquid crystal layer, presents the problems of an unintended voltage being applied to the liquid crystal layer, parasitic capacitance being generated, and the like.

By contrast, in the liquid crystal display device 1 according to the present embodiment, the TFTs 20 are each formed of the second conductive layer and the third conductive layer, and the plurality of lead lines 10 include, in addition to the second lead lines 10B formed of the second conductive layer and the third lead lines 10C formed of the third conductive layer, the first lead lines 10A formed of the first conductive layer located lower than the second conductive layer. That is, in the liquid crystal display device 1 according to the present embodiment, the plurality of lead lines 10 are located more remotely from the liquid crystal layer 4 than in the display device described in Patent Literature 1. Thus, in the liquid crystal display device 1, an unintended voltage is less likely to be applied to the liquid crystal layer 4, and unintended parasitic capacitance is less likely to be generated. As a result, it is possible to suppress deterioration of the display quality.

As set forth above, the present embodiment can provide the liquid crystal display device 1 in which the picture-frame region is reduced while deterioration of the display quality is suppressed.

Second Embodiment

Next, a second embodiment of the present invention is described with reference to FIGS. 10 and 11.

A liquid crystal display device according to the second embodiment has a substantially similar construction to the above-described first embodiment, but differs from the first embodiment in terms of the construction of the lead lines. Thus, in the second embodiment, only the lead lines are described.

Figure 10:
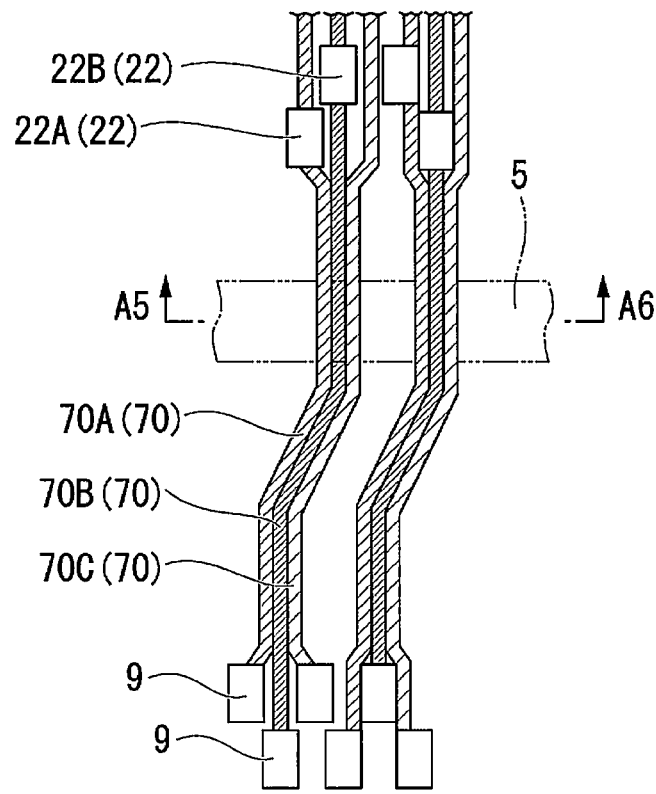
FIG. 10 is an enlarged view illustrating a lead wiring section of a liquid crystal display device according to a second embodiment.

FIG. 10 is an enlarged view illustrating lead wiring in the liquid crystal display device according to the second embodiment. FIG. 11 is a sectional view taken along line A5-A6 of FIG. 10.

Figure 11:
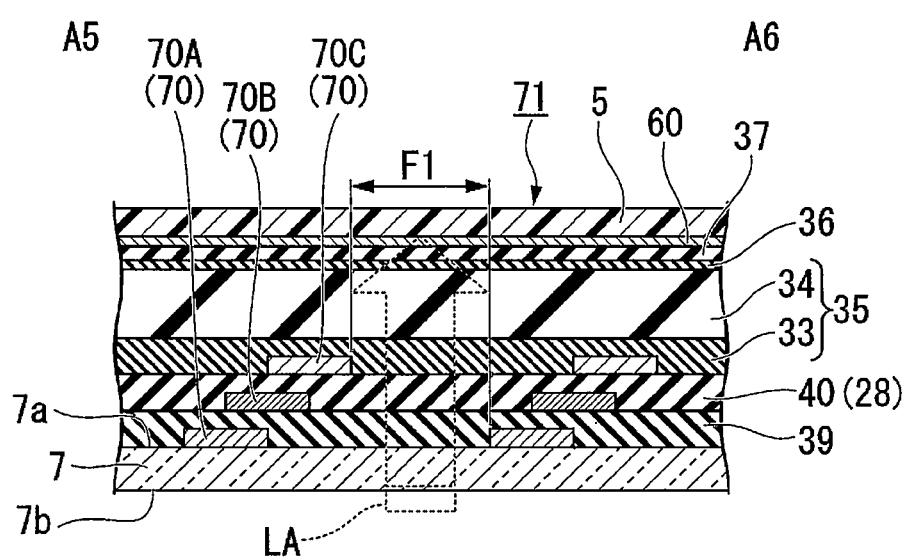
FIG. 11 is a sectional view taken along line A5-A6 of FIG. 10.

In FIGS. 10 and 11, the same component elements as in the figures illustrating the first embodiment are denoted by the same reference numerals and characters as in the figures illustrating the first embodiment, and such same component elements are not described here.

In the above-described first embodiment, the first lead line, the second lead line, and the third lead line do not overlap one another when viewed in plan view in the direction normal to the element substrate. By contrast, in the liquid crystal display device according to the second embodiment, as illustrated in FIGS. 10 and 11, a portion of the first lead line 70A and a portion of the second lead line 70B overlap each other and a portion of the second lead line 70B and a portion of the third lead line 70C overlap each other. The second embodiment is similar to the first embodiment in terms of the other structural features.

The second embodiment achieves the same advantageous effect, as achieved by the first embodiment, of being able to provide a liquid crystal display device 1 in which the picture-frame region is narrowed while deterioration of the display quality is suppressed.

In a case in which the second embodiment employs the sealing material 5 formed of a photo-curable resin, the sealing material 5 can be cured by irradiating the sealing material 5 with light LA from the second surface 7b of the first substrate 7 after bonding the element substrate 71 and the counter substrate 3 to each other, as illustrated in FIG. 11. At such a time, the irradiation of the light LA tends to be insufficient in portions of the sealing material 5 that are shaded by the lead lines 70, and thus, it becomes necessary to increase the amount of the light to supplement the insufficiency. In this regard, the second embodiment can reliably ensure a sufficient amount of the light for curing the sealing material 5, because the lead lines 70 partly overlap one another as noted above, and thus, intervals F1 between the lead lines 70 are increased compared with the intervals in the first embodiment.

Third Embodiment

Next, a third embodiment of the present invention is described with reference to FIG. 12.

A liquid crystal display device according to the third embodiment has a substantially similar construction to the above-described first embodiment, but differs from the first embodiment in terms of the construction of the lead lines. Thus, in the third embodiment, only the lead lines are described.

Figure 12:
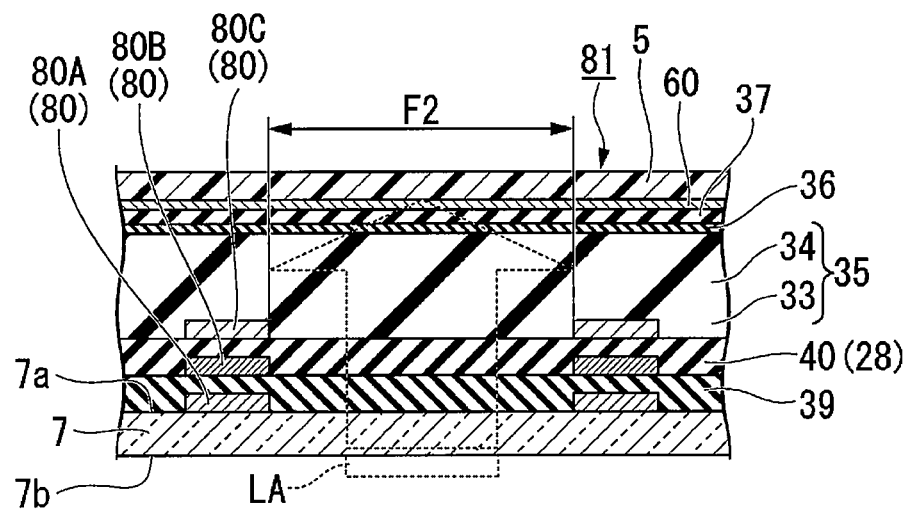
FIG. 12 is an enlarged view illustrating a lead wiring section of a liquid crystal display device according to a third embodiment.

FIG. 12 is a sectional view of the lead wiring in the liquid crystal display device according to the third embodiment.

In FIG. 12, the same component elements as in the figures illustrating the first embodiment are denoted by the same reference numerals and characters as in the figures illustrating the first embodiment, and such same component elements are not described here.

In the liquid crystal display device according to the third embodiment, all of the first lead line 80A, the second lead line 80B, and the third lead line 80C superpose one another when viewed in plan view in the direction normal to the element substrate 81, as illustrated in FIG. 12. The third embodiment is similar to the first embodiment in terms of the other structural features.

The third embodiment achieves the same advantageous effect, as achieved by the first and second embodiments, of being capable of providing a liquid crystal display device in which enables the picture-frame region is narrowed while deterioration of the display quality is suppressed.

In a case in which the third embodiment employs the sealing material 5 formed of a photo-curable resin, the third embodiment can even more reliably ensure a sufficient amount of the light for curing the sealing material 5, because all of the lead lines 80 superpose one another and thus intervals F2 between the lead lines 80 are much wider than those in the second embodiment.

Fourth Embodiment

Next, a fourth embodiment of the present invention is described with reference to FIG. 13.

A liquid crystal display device according to the fourth embodiment has a substantially similar construction to the above-described first embodiment, but differs from the first embodiment in terms of the construction of the lead lines. Thus, in the fourth embodiment, only the lead lines are described.

Figure 13:
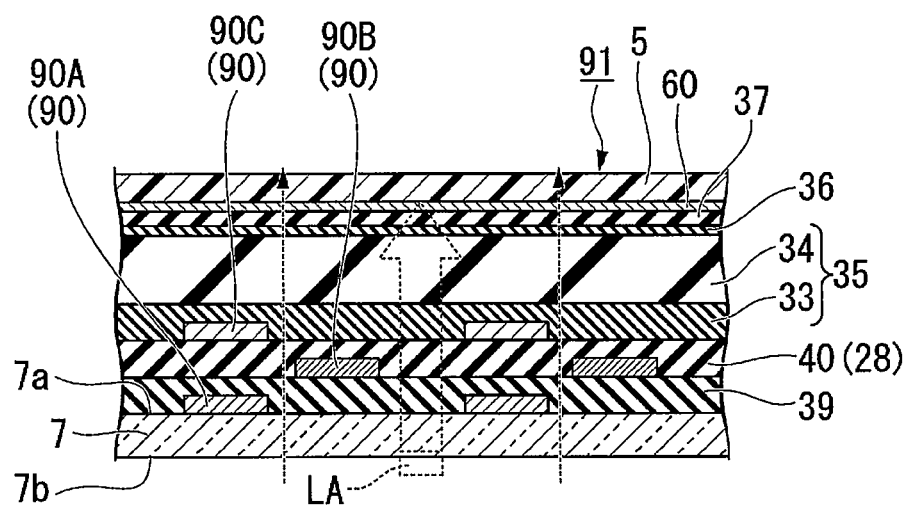
FIG. 13 is an enlarged view illustrating a lead wiring section of a liquid crystal display device according to a fourth embodiment.

FIG. 13 is a sectional view of the lead wiring in the liquid crystal display device according to the fourth embodiment.

In FIG. 13, the same component elements as in the figures illustrating the first embodiment are denoted by the same reference numerals and characters as in the figures illustrating the first embodiment, and such same component elements are not described here.

In the liquid crystal display device according to the fourth embodiment, as illustrated in FIG. 13, the first lead line 90A and the third lead line 90C superpose each other, but the first lead line 90A and third lead line 90C do not superpose the second lead line 90B, when viewed in plan view in the direction normal to the element substrate 91. The fourth embodiment is similar to the first embodiment in terms of the other structural features.

The fourth embodiment achieves the same advantageous effect, as achieved by the first to third embodiments, of being capable of providing a liquid crystal display device in which the picture-frame region is narrowed while deterioration of the display quality is suppressed.

Although the third embodiment has the advantage of being capable of ensuring a sufficient amount of light for curing the sealing material, the distance between the first lead line and the second lead line in the thickness direction and the distance between the second lead line and the third lead line in the thickness direction are small that parasitic capacitance generated between the lead lines increases. As a result, electric signals tend to be rounded, and consequently, the display quality may be adversely influenced in some cases. By contrast, in the liquid crystal display device according to the fourth embodiment, since the first lead line 90A and the third lead line 90C superpose each other, a distance between the superposing lead lines 90 is longer than in the third embodiment. Consequently, parasitic capacitance between the lead lines 90 can be kept small, with the result that the fourth embodiment can suppress influences on the display quality due to the parasitic capacitance.

The technical scope of the present invention is not limited to the above-described embodiments and various modifications of the embodiments may be possible without departing from the spirit of the present invention.

For example, in the embodiments described above, an example in the case in which the lead lines according to an aspect of the present invention are used as source lead-out lines is described. The present invention, however, is not limited thereto, and the lead lines according to an aspect of the present invention may be used as gate lead-out lines. Also, the specific descriptions pertaining to shapes, numbers, positions, materials, and the like of the individual component elements of the liquid crystal display devices according to the embodiments may be modified as necessary.

INDUSTRIAL APPLICABILITY

An aspect of the present invention may be applied not only to a liquid crystal display device, but also to various other display devices, such as an organic electro-luminescence display device and an electrophoretic display device.

REFERENCE SIGNS LIST 1 liquid crystal display device (display device), 2, 71, 81, 91 element substrate, 3 counter substrate, 4 liquid crystal layer (electro-optical material layer), 5 sealing material, 7 first substrate, 9 connection terminal, 10, 70, 80, 90 lead line, 10A, 70A, 80A, 90A first lead line, 10B, 70B, 80B, 90B second lead line, 10C, 70C, 80C, 90C third lead line, 12 second substrate, 18 source line, 19 gate line, 20 thin film transistor (switching element)

The invention claimed is:

1. A display device comprising:
a first substrate;
a second substrate provided opposing a first surface of the first substrate;
an electro-optical material layer provided between the first substrate and the second substrate;
a plurality of signal lines provided on the first surface;
a plurality of switching elements provided on the first surface;
a plurality of connection terminals provided on the first surface; and
a plurality of lead lines provided on the first surface and electrically connecting at least some of the plurality of signal lines and at least some of the plurality of connection terminals,
wherein the plurality of lead lines include:
a first lead line formed of a first conductive layer provided on the first surface;
a second lead line formed of a second conductive layer provided on a first insulating film covering the first lead line; and
a third lead line formed of a third conductive layer provided on a second insulating film covering the second lead line, and
wherein a lowest conductive layer among a plurality of conductive layers forming the switching elements is formed of the second conductive layer, and layered directly on the first surface.

2. The display device according to claim 1, wherein each of the switching elements is a thin film transistor,
the plurality of signal lines include a plurality of gate lines and a plurality of source lines, and
the lead lines electrically connect the source lines and the connection terminals.

3. The display device according to claim 2, wherein a gate electrode of the thin film transistor is formed of the second conductive layer.

4. The display device according to claim 1, further comprising a sealing material that bonds the first substrate and the second substrate to each other,
   wherein as viewed in a direction normal to the first substrate, the plurality of lead lines intersect the sealing material.

5. The display device according to claim 4, wherein as viewed in the direction normal to the first substrate, the first lead line, the second lead line, and the third lead line are provided at positions such that the first lead line, the second lead line, and the third lead line overlap one another at least partly.

6. The display device according to claim 1, wherein the plurality of signal lines include a plurality of gate lines and the plurality of gate lines are formed of the second conductive layer.

* * * * *